United States Patent [19]

Fencl et al.

[11] 3,952,630

[45] Apr. 27, 1976

[54] TRUCK RIM EDGE MILLING APPARATUS

[75] Inventors: Vernon Fencl, Northbrook; Alberts Roze, Chicago, both of Ill.

[73] Assignee: Grotnes Machine Works, Inc., Chicago, Ill.

[22] Filed: Mar. 5, 1975

[21] Appl. No.: 555,686

Related U.S. Application Data

[63] Continuation of Ser. No. 414,705, Nov. 12, 1973, abandoned.

[52] U.S. Cl. .............................. 90/15 R; 29/159.1; 90/24 A
[51] Int. Cl.² ......................................... B23C 3/12
[58] Field of Search ............... 90/11 R, 15 R, 24 A, 90/16; 83/465, 488; 59/29; 51/56, 114; 29/159.1

[56] References Cited
UNITED STATES PATENTS 2,273,624  2/1942  Campbell et al. .................... 51/56 X
3,097,570  7/1963  Mackey ................................. 90/16

Primary Examiner—Othell M. Simpson
Assistant Examiner—Z. R. Bilinsky
Attorney, Agent, or Firm—Wolfe, Hubbard, Leydig, Voit & Osann, Ltd.

[57] ABSTRACT

Apparatus for milling the end edge surfaces of truck rims to remove weld projections including a frame having a clamping means for holding the rim in an operating station, a pair of spaced apart power heads carrying cutting tools and actuator means for moving the power heads and cutting tools at a predetermined spaced apart distance transversely with respect to the axis of the rim to remove the weld projections. The upper power head and cutting tool are mounted for vertical movement and stop means carried by the upper power head directly locates the spaced apart position for the upper cutter to remove the top weld projection on the rim.

7 Claims, 5 Drawing Figures

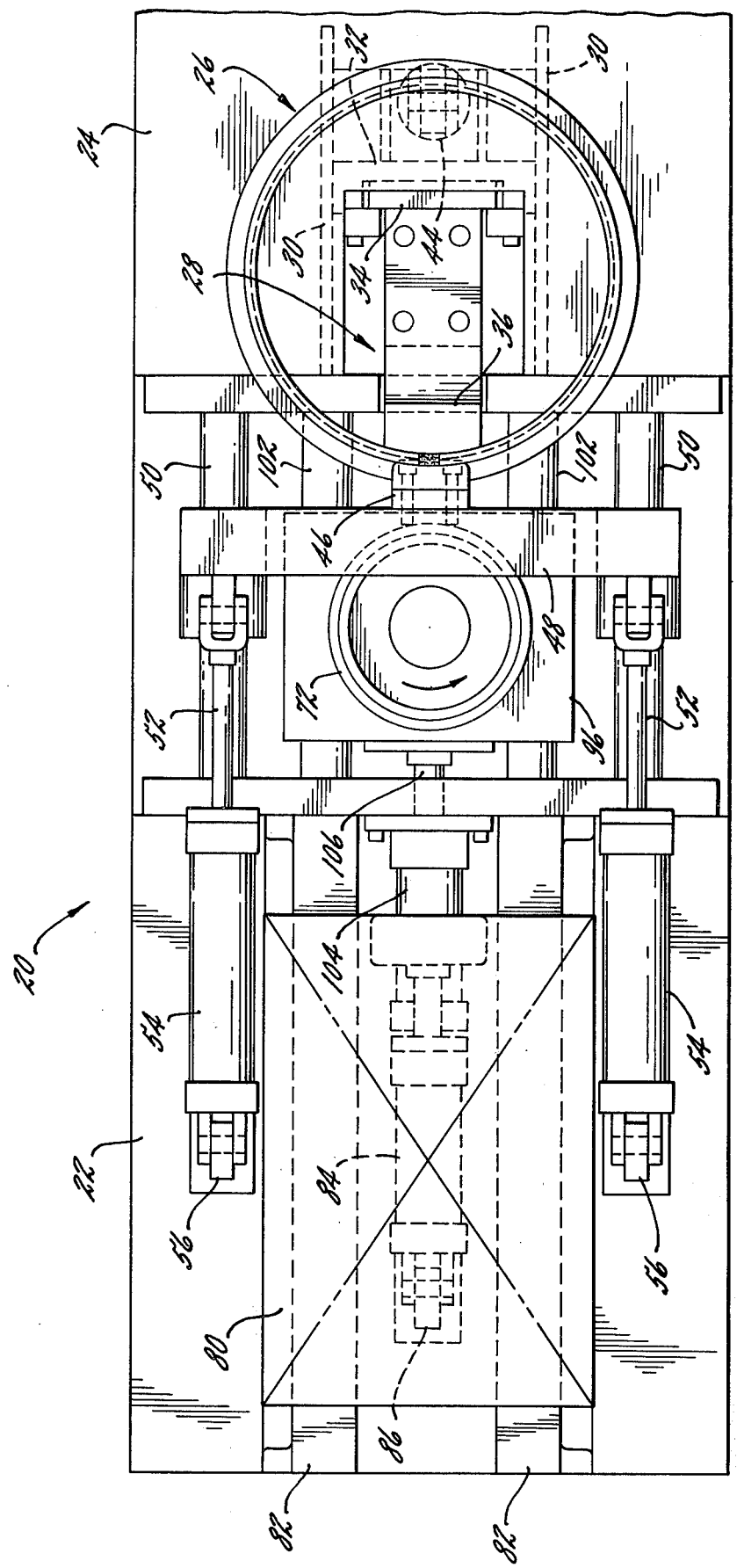

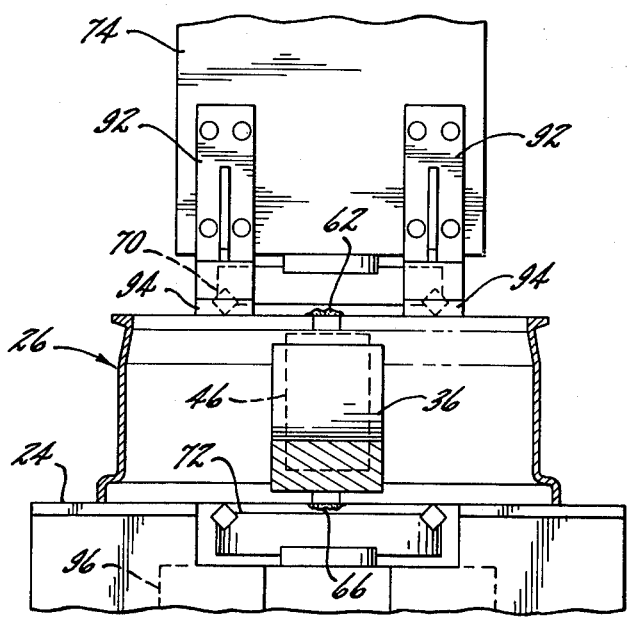
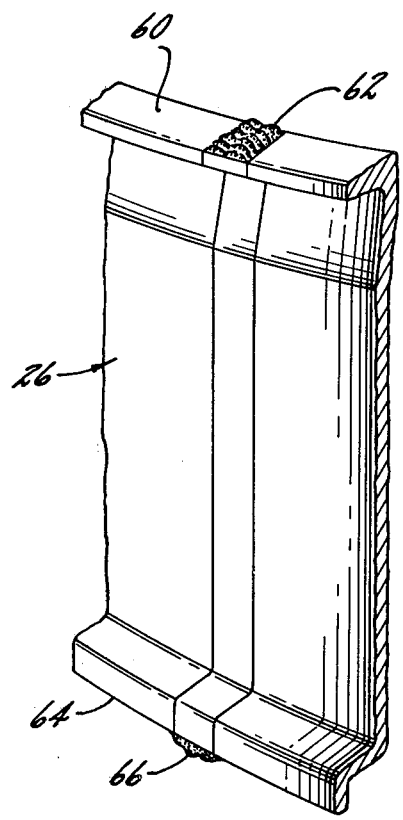
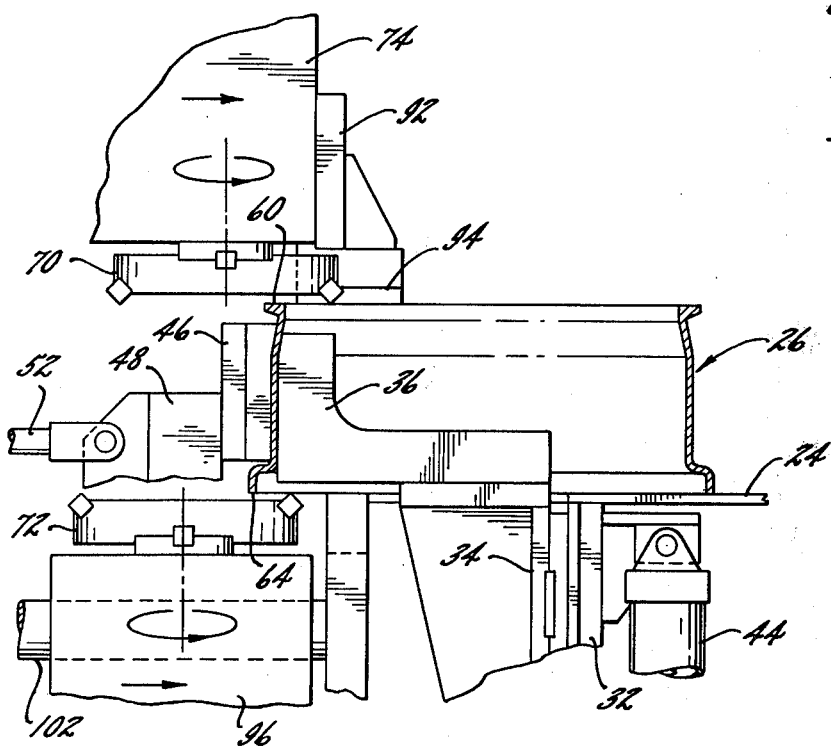

TRUCK RIM EDGE MILLING APPARATUS

This is a continuation, of application Ser. No. 414,705 filed Nov. 12, 1973, and now abandoned.

BACKGROUND OF THE INVENTION

The present invention relates generally to apparatus for finishing or cleaning a portion of the welded joint area of shells produced for truck rims on a continuous mass production basis following the initial operations of forming the cylindrical shape from a precut length of workpiece stock, preparing the cylindrical article for welding and then welding the edges. More particularly, the invention concerns apparatus for cleaning the weld projection at the outer ends of the formed rim article.

RELATED APPLICATIONS

Vernon Fencl and Hans R. Luedi, application Ser. No. 414,722 filed Nov. 12, 1973 and now abandoned, on Automatic Truck Rim Weld Cleanup Process.

DESCRIPTION OF THE INVENTION

There is disclosed and claimed in the aforementioned Vernon Fencl, et al. U.S. Pat. application Ser. No. 414,722, a process for finishing or cleaning the welded area of shells for truck rims manufactured on a continuous mass production basis following the initial operations of forming the cylindrical shape from a pre-cut length of workpiece stock, preparing the cylindrical article for welding and then the welding itself.

As disclosed in the Fencl, et al. application, truck rims, as contrasted to automobile wheels that may be fabricated from flat sheet stock, are more desirably manufactured from a formed or shaped stock that in its "flat" or undeveloped state already includes the cross-sectional configuration of the finished truck rim. Such stock is so used because a lesser overall final weight of the truck rim can be obtained by having thicker sections in the areas where greater stress will be encountered and thinner sections provided where minimum or low stress areas occur.

Since the forming operation starts out with an elongated length of pre-formed metal which is coiled or otherwise formed generally into the cylindrical shell the ends as the article leaves the coiler are warped or flared out. Thus, further forming, end shearing and closing operations are required to prepare the cylindrical shell for welding. After welding, such as by flash butt welding apparatus, there is an excess of weld material projecting outwardly from the inner and outer peripheral side walls as well as the end edges of the shell.

In the aforesaid Fencl et al. application, the procedure for cleaning and finishing the weld area includes automatically trimming the inner and outer side wall weld projections, machining the ends to remove the end weld projections, coining the weld area in the side wall, and deburring the edges of the shell ends.

Accordingly, it is a general aim of the present invention to provide an improved milling apparatus which is characterized by the ability to perform the end milling operation to remove the projections at the ends of the welded rim article while achieving the desired rates of mass production lines.

Another object of the invention is to provide an apparatus for end milling the edges of the welded truck rim shell which is completely automatic in operation and capable of rapidly and efficiently performing the removal operation even on a variety of different sized rim shells.

Other objects and advantages of the invention will become apparent as the following description proceeds, taken in conjunction with the accompanying drawings.

DESCRIPTION OF THE DRAWINGS

FIG. 2 is a sectional view taken substantially along the line 2—2 in FIG. 1;

FIG. 3 is a fragmentary sectional view taken substantially along the line 3—3 in FIG. 1;

FIG. 4 is a fragmentary enlarged perspective view showing the weld area of the rim product with which the apparatus of FIG. 1 operates; and FIG. 5 is a fragmentary side view of the operating station of the apparatus of FIG. 1 here showing the completion of the machining operation.

Figure 1:
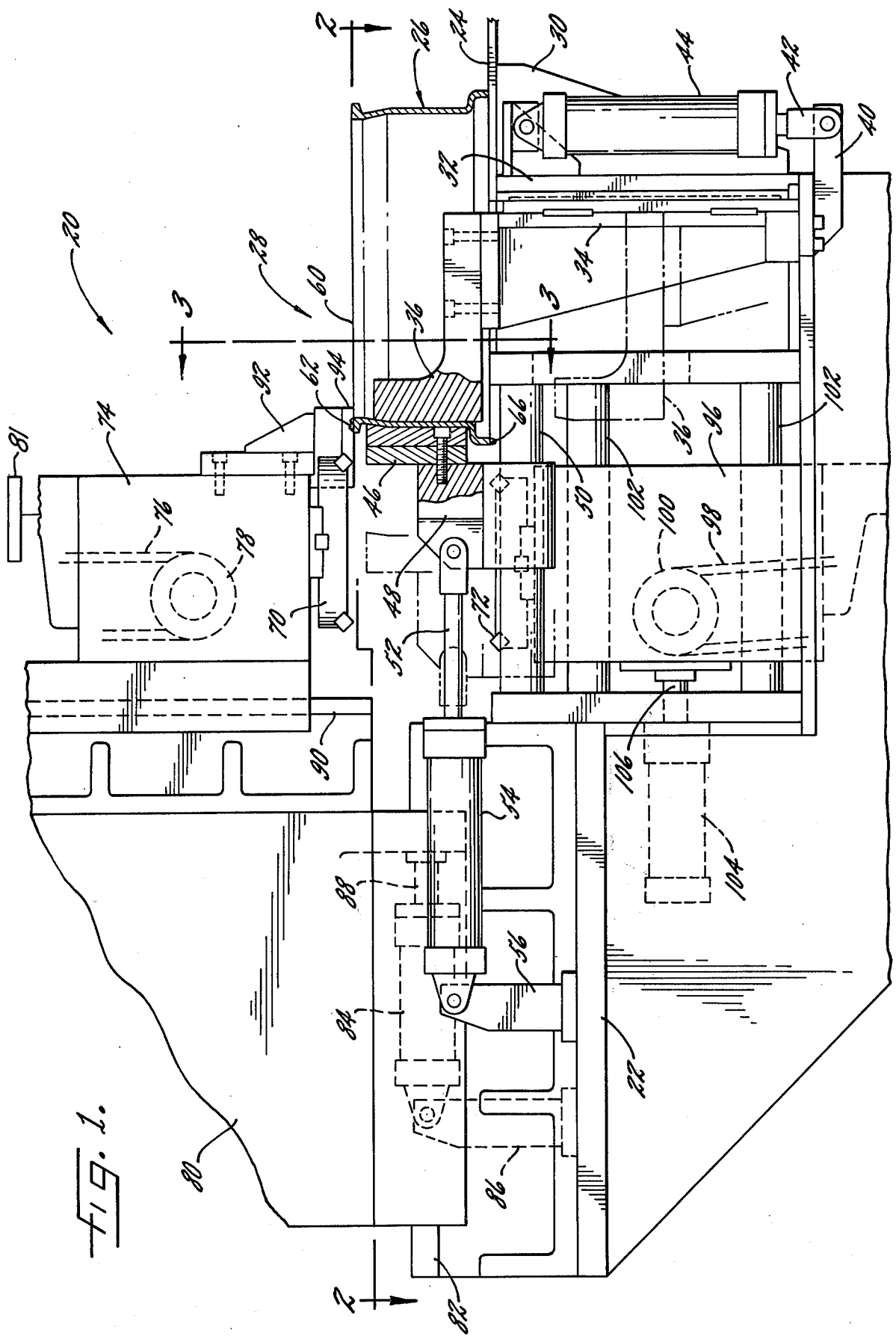
FIG. 1 is a fragmentary side elevation of an end milling apparatus constructed according to the present invention, partly in section with a rim article being held in position in readiness for performance of the end machining operation.

While the invention is susceptible of various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents and alternatives falling within the spirit and scope of the invention as expressed in the appended claims.

DETAILED DESCRIPTION

Referring to the drawings, there is shown in FIG. 1 an exemplary rim end milling apparatus, generally indicated at 20, embodying the present invention. The apparatus 20 includes a main frame 22 with a rim receiving and support table 24 adapted to receive a rim 26 in operating station 28.

Referring to FIGS. 1 and 2, conjointly, the rim receiving table 24 disposed in the pass line or plane in which the rims are transported to and from the apparatus 20 is supported by upright members 30 bridged by a vertical guideway 32. The guideway 32 carries a vertically movable slide 34 having an inner clamp member 36 connected to the top of the slide. A horizontally disposed arm 40 having one end attached to the bottom of the slide 34 has its outer end coupled to the piston rod 42 of an actuator cylinder 44 fixedly mounted to the bridge member 32. Thus, actuation of the cylinder raises and lowers the clamp member 36 with respect to the rim supporting table 24.

To complete the clamping action, an outer clamp member is arranged for horizontal shifting to move against the outer periphery of the rim 26 and firmly hold it against the inner clamp member 36. To this end, the outer clamp member 46 is secured to a yoke member 48 which is slidably carried by a pair of spaced apart rods 50 (FIG. 2) which are secured to the frame 22. Each of the outer ends of the yoke 48 are connected to piston shafts 52 of spaced apart actuators 54 fixedly mounted to the frame 22 by support members 56. The arrangement is such that movement of the actuators to the left as viewed in FIGS. 1 and 2 retracts the outer clamp member 46 horizontally to the left and actuation to the right moves the clamp member 46 into clamping position.

In carrying out the present invention, provision is made for removal of the weld projections at the ends of the rim 26 by spaced apart milling means positioned above and below the rim supported on the table 24. Referring to FIG. 4, there is shown an enlarged perspective view of the welded seam of the rim 26 illustrating the upper flanged end surface 60 containing the weld material projection 62 and the lower end surface 64 having a similar weld material projection 66.

To remove these projections, referring to FIG. 1, upper milling cutter 70 and lower milling cutter 72 are arranged to move transversely with respect to the rim so that the projections are removed down to the plane of the end surfaces 60, 64 respectively.

The upper cutter 70 is rotatably carried by upper power head 74 containing a gear train, not shown, driven from a motor (not shown) through belt 76 and pulley 78. The power head 74 is slidably carried for vertical movement with respect to a vertical slide column 80 which in turn is slidably carried for horizontal movement with respect to the frame 22 on a horizontal guideway 82. To control the horizontal movement of the column 80, there is provided an actuator 84 secured to the frame 22 by a coupling member 86 and the piston rod 88 of actuator 84 is attached to the column 80. (FIG. 1) Similarly, the power head 74 is moved vertically on guideway 90 of column 80 with an actuator indicated diagrammatically at 81.

In order to position the cutter 70 with respect to the rim 26, a pair of spaced apart stops 92 (FIGS. 1, 3 and 5) are carried by the power head 74 and arranged so that the abutment numbers 94 of the stops engage the upper end flange surface 60 of the rim 26 to determine the lower limit of travel of the cutter 70 in the vertical direction prior to its being moved horizontally for cutting off the upper weld projection 62.

The lower cutter 72 is rotatably carried by a power head 96 including a gear train (not shown) also driven by a belt 98 and pulley 100 from a motor (not shown). The lower power head 96 is slidably carried by spaced apart rods 102 supported by the frame 22. For the purpose of moving the power head 96 and its cutter 72 in the horizontal direction a fluid actuator 104 carried by the frame 22 has its actuator rod 106 attached to the power head 96.

In order to more fully understand the apparatus of the present invention, a brief description of the typical cycle of operation will be discussed, beginning with reference to FIG. 1 wherein a cycle "start" position is illustrated. A rim 26 to be operated on is moved onto the support table 24 with the welded seam being disposed to the left as viewed in FIG. 1. At this point, actuator 44 raises the inner clamp member 36 carried by its slide 34 to its position within the rim as shown in FIG. 1. Then, actuators 54 move the outer clamp member 46 against the outer peripheral surface of the rim 26 which firmly clamps and holds the rim in the operating station 28. The lower cutter 72 may then be rotatably activated and actuator 104 moves the cutter with its power head 96 horizontally to remove the weld projection 66 at the lower end of the rim 26 (FIG. 5). The cutting plane is established by the table 24 so the lower cutter 72 need only be moved in the horizontal direction.

Since the apparatus as indicated previously is capable of handling different width rims, the upper cutter automatically adjusts itself to accommodate the particular width rim being worked on. Thus, the power head 74 lowers until abutments 94 engage the upper surface of the rim which then defines the plane that the cutter 70 will travel horizontally after it has been activated to rotate for cutting. The horizontal movement is controlled by actuator 84 which moves the supporting column 80 and the power head 74 carrying cutter 70 (FIGS. 1 and 5) to remove the upper surface weld projection 62.

After the weld projections have been removed, the power heads 74, 96 retract horizontally and the upper power head 74 is moved vertically out of the way.

Clamping member 46 is then moved to the left as viewed in FIG. 1 to release the rim 26 and clamping member 36 is moved downwardly to permit the finished rim to be transferred to the next station and a new rim 26 brought into position for the next cycle.

We claim as our invention:

1. Apparatus for machining the end edge surfaces of generally cylindrical truck rims for removing the weld projections thereon in an automated production line comprising in combination a frame having a work station for receiving rims transported along a pass line with the rim axis being perpendicular to the pass line, clamping means including an inner clamp member movable transversely with respect to the rim in the work station and an outer clamp member movable radially with respect to said rim and adapted to hold the rim stationary against said inner clamp member, a pair of spaced apart power heads carrying rotatable cutting tools mounted on said frame adjacent said work station, said power heads and cutting tools being movable transversely relative to the axis of a rim held in said fixed position in said work station and actuator means for moving said power heads and cutting tools located at a predetermined spaced apart distance transversely with respect to the axis of said fixed rim into said work station to remove the weld projections at opposite ends of said rim.

2. Apparatus as claimed in claim 1 wherein one of said power heads is movable toward and away from said other power head and cutter, means for moving said power head and cutter relative to the other one.

3. Apparatus as claimed in claim 2 wherein said relatively movable power head includes stop means for locating the spaced apart position for said movable power head and cutter to remove one of said weld projections on said rim.

4. Apparatus as claimed in claim 3 wherein said other power head and cutter are positioned to remove the other of said weld projections on said rim when the cutter is moved transversely relative to the rim held in said work station.

5. Apparatus as claimed in claim 4 wherein said rim held in the work station rests on table means which establishes the cutting plane for said other cutter moved transversely relative to the rim.

6. Apparatus as claimed in claim 3 wherein said stop means includes abutment members carried by said relatively movable power head, said abutment members being adapted to directly engage the upper end of said rim to determine the lower limit of travel of the movable power head and cutter toward said other power head.

7. Apparatus as claimed in claim 1 wherein said inner clamp member is movable in the direction of the rim axis so that it can be located inside said rim in the work station and an outer clamp member movable radially with respect to said rim and adapted to hold the rim stationary against said inner clamp member.

* * * * *